(12) United States Patent
Bilger (10) Patent No.: US 8,825,672 B1
(45) Date of Patent: Sep. 2, 2014

(54) SYSTEM AND METHOD FOR DETERMINING ORIGINALITY OF DATA CONTENT

(71) Applicant: Amazon Technologies, Inc., Reno, NV (US)

(72) Inventor: Jeffrey Matthew Bilger, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/854,832

(22) Filed: Apr. 1, 2013

Related U.S. Application Data (63) Continuation of application No. 12/886,343, filed on Sep. 20, 2010, now Pat. No. 8,412,718.

(51) Int. Cl.
*G06F 17/30* (2006.01)

(52) U.S. Cl.
USPC ........... 707/748; 707/695; 707/758; 705/14.4

(58) Field of Classification Search
USPC .......... 707/748, 749, 750, 758, 695; 705/14.4
See application file for complete search history.

(56) References Cited

U.S. PATENT DOCUMENTS

| | | | | |
|---|---|---|---|---|
| 6,317,752 | B1 * | 11/2001 | Lee et al. | 707/748 |
| 2004/0260694 | A1 * | 12/2004 | Chaudhuri et al. | 707/5 |
| 2007/0005556 | A1 * | 1/2007 | Ganti et al. | 707/1 |
| 2007/0260653 | A1 * | 11/2007 | Jaffri et al. | 707/205 |
| 2009/0222392 | A1 * | 9/2009 | Martin et al. | 706/46 |
| 2009/0287780 | A1 * | 11/2009 | Gawor et al. | 709/206 |
| 2010/0049736 | A1 * | 2/2010 | Rolls et al. | 707/103 R |
| 2010/0100416 | A1 * | 4/2010 | Herbrich et al. | 705/10 |
| 2010/0161595 | A1 * | 6/2010 | Martin et al. | 707/722 |
| 2010/0268661 | A1 * | 10/2010 | Levy et al. | 705/347 |
| 2011/0064221 | A1 * | 3/2011 | McSherry et al. | 380/252 |
| 2011/0106795 | A1 * | 5/2011 | Maim | 707/728 |
| 2011/0213776 | A1 * | 9/2011 | Martin et al. | 707/737 |
| 2012/0005238 | A1 * | 1/2012 | Jebara et al. | 707/798 |

* cited by examiner

*Primary Examiner* — Phong Nguyen
(74) *Attorney, Agent, or Firm* — Knobbe, Martens, Olson & Bear, LLP (57) ABSTRACT

The present invention provides systems and methods for determining the originality of data content. In one embodiment, the determined originality of a particular item (e.g., a book) as compared to one or more other items can be used as a factor in recommending the item to a user. For example, in one embodiment, upon a user's selection of an item (e.g., a book), one or more items that have content most diverse from the selected item are determined and provided to the user. In another embodiment, various versions of an item are compared to each other to determine how content in each version differs from that in another version. In another embodiment, content in a collection of items are compared against content from publicly (freely) available sources (e.g., web pages) to determine the originality of the content in the collection of items.

12 Claims, 11 Drawing Sheets

SYSTEM AND METHOD FOR DETERMINING ORIGINALITY OF DATA CONTENT

CROSS-REFERENCE TO RELATED APPLICATION

This application is a continuation of and claims benefit of priority to U.S. patent application Ser. No. 12/886,343, filed Sep. 20, 2010, entitled "SYSTEM AND METHOD FOR DETERMINING ORIGINALITY OF DATA CONTENT," which is hereby incorporated herein by reference in its entirety.

BACKGROUND

Electronic commerce is an increasingly popular way of selling products and services, referred to herein collectively and interchangeably as "items," to consumers. To assist consumers in selecting products and services, many electronic commerce vendors provide recommendations to consumers. For example, consumers who are shopping for books may be provided recommendations to books that are similar or complementary to the books that they are browsing. Most such recommendations are based on prior consumer activities, such as user behavior data, e.g., records of items purchased together or common items viewed by the same consumers and focus on recommending substitute or complementary items.

While some of these recommendations may assist consumers in making purchase decisions or discovering new items, these recommendations are not based on the content of the items. For certain types of items such as books, it may be desirable for consumers to receive recommendations that are based at least in part on the content of the items, rather than solely on user behavior data.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Most recommendation systems focus on recommending substitute items or complementary items and are often based on what items the users of the systems have viewed, purchased or rated. In certain situations, e.g., in selecting a book for purchase, a recommendation based on the originality or diversity of an item's content may be desirable. For example, it may be desirable to find books that have original content, as many books are often compilations of content from previously published books. If the originality or diversity of the content of the book is used to make the recommendation, different books of more interest to the user may be recommended. If a recommendation is based on what items have been viewed, purchased, or rated, the recommended items may simply include updated versions of the book, in which most of the content has been duplicated and is consequently of less interest to the user. In contrast, if the recommendation is based on the originality of the content of the book, a recommendation of another book with more diverse content, and thus, of more interest to the user, may be made.

Unfortunately, the originality or diversity of content typically cannot be deduced by user behavior data. While a recommendation system could solicit user feedback on originality or diversity of content, requiring explicit user feedback is undesirable in that many users do not take the time to provide such feedback. Embodiments disclosed herein provide systems and methods for determining originality of content that do not rely on user feedback, and using the determined originality in making recommendations to the user. In one embodiment, the determined originality of the content of a particular item (e.g., a book) as compared to one or more other items can be used as a factor in recommending an item to a user. For example, upon a user's selection of a book, one or more similar or complementary books (based on behavior data) that have content most diverse from the selected book are determined and provided to the user. In another embodiment, various versions of an item are compared to each other to determine how content in each version differs from that in another version. In another embodiment, content in a collection of items are compared against content from publicly (freely) available sources (e.g., web pages) to determine the originality of the content in the collection of items. These embodiments are further described below in conjunction with the associated figures. Although numerous examples provided herein relate to books, it is understood that the systems and methods provided herein are applicable to other types of items for which semi-structured data content is available (e.g., magazines, web pages, audio content, video content, etc.).

Original Content Determination System

Figure 1:
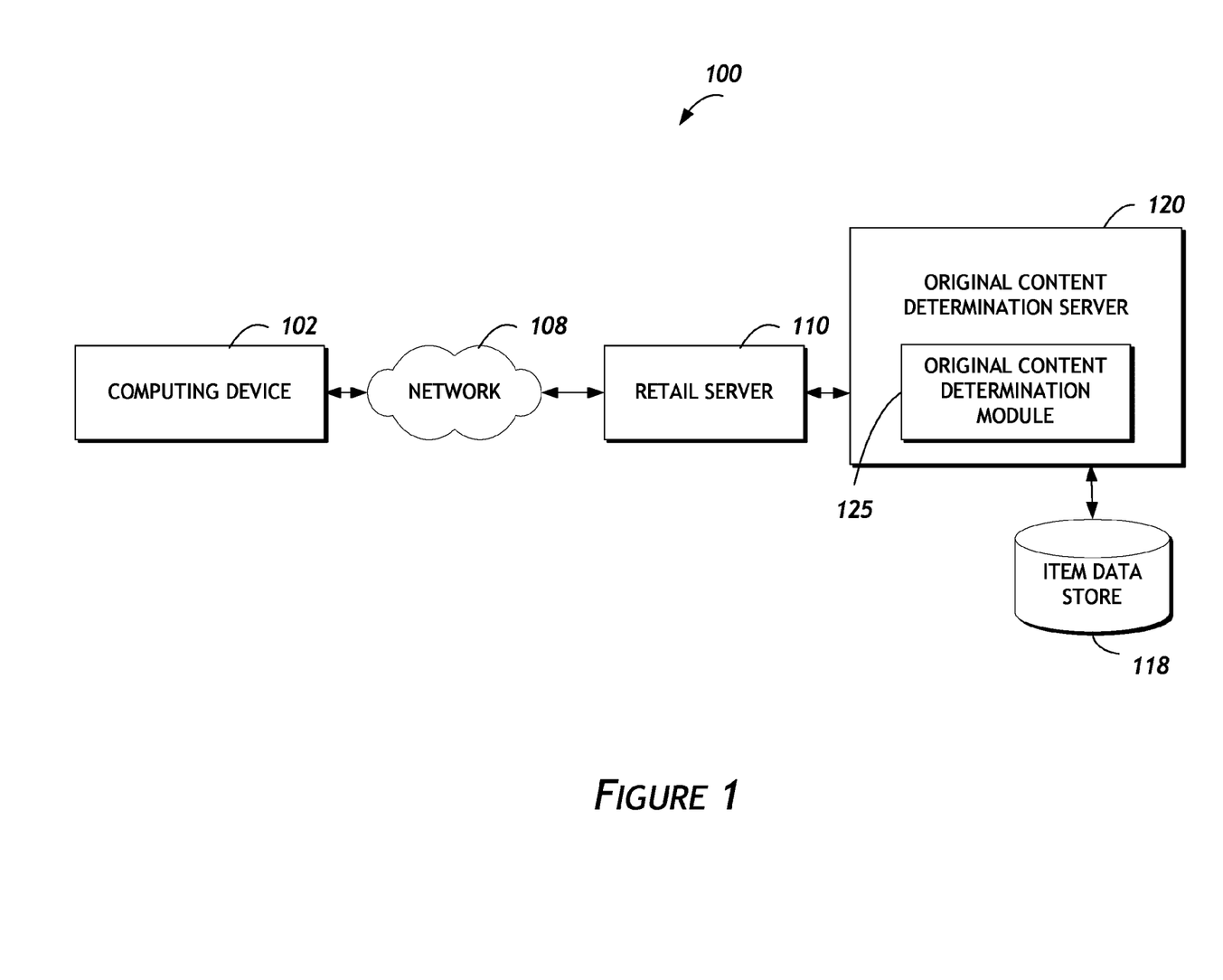
FIG. 1 is a block diagram depicting an illustrative operating environment including a retail server and a original content determination server for determining the originality of content for a plurality of items in accordance with one embodiment.

The illustrative operating environment shown in FIG. 1 includes a system 100 in which users may view, rate, or purchase one or more items. The system 100 may include an original content determination server 120 that includes an original content determination module 125 for determining originality/diversity of items and/or using the determined originality/diversity to provide item recommendations to users of the system 100. The environment also includes a retail server 110 that facilitates electronic browsing and purchasing of goods and services using various user devices, such as computing device 102. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, and the like. The original content determination server 120, which will be described below in more detail, may be connected to or in communication with an item data store 118 that stores information associated with items available for purchase through the retail server 110, and/or items for which information is available to users, but which are not currently available to be ordered. Item data stored in the item data store 118 may include any information related to an item that may be of interest to a user or may be useful for classifying the item. For example, item data may include, but is not limited to, price, availability, title, item identifier, item feedback (e.g., user reviews, ratings, etc.), item image, item description, item attributes, tags associated with the item, etc.

In different embodiments, the item data store 118 may be local to the original content determination server 120, may be local to the retail server 110, may be remote from both the original content determination server 120 and retail server 110, and/or may be a network-based service itself. In the environment shown in FIG. 1, a user of the system 100 may utilize the computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and peer-to-peer network configurations to implement at least a portion of the processes.

In brief, the retail server 110 is generally responsible for providing front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services (referred to herein as "items") from one or more data stores (not illustrated), as is done in conventional electronic commerce systems. In certain embodiments, the retail server 110 may also access item data from other data sources, either internal or external to system 100.

Figure 2:
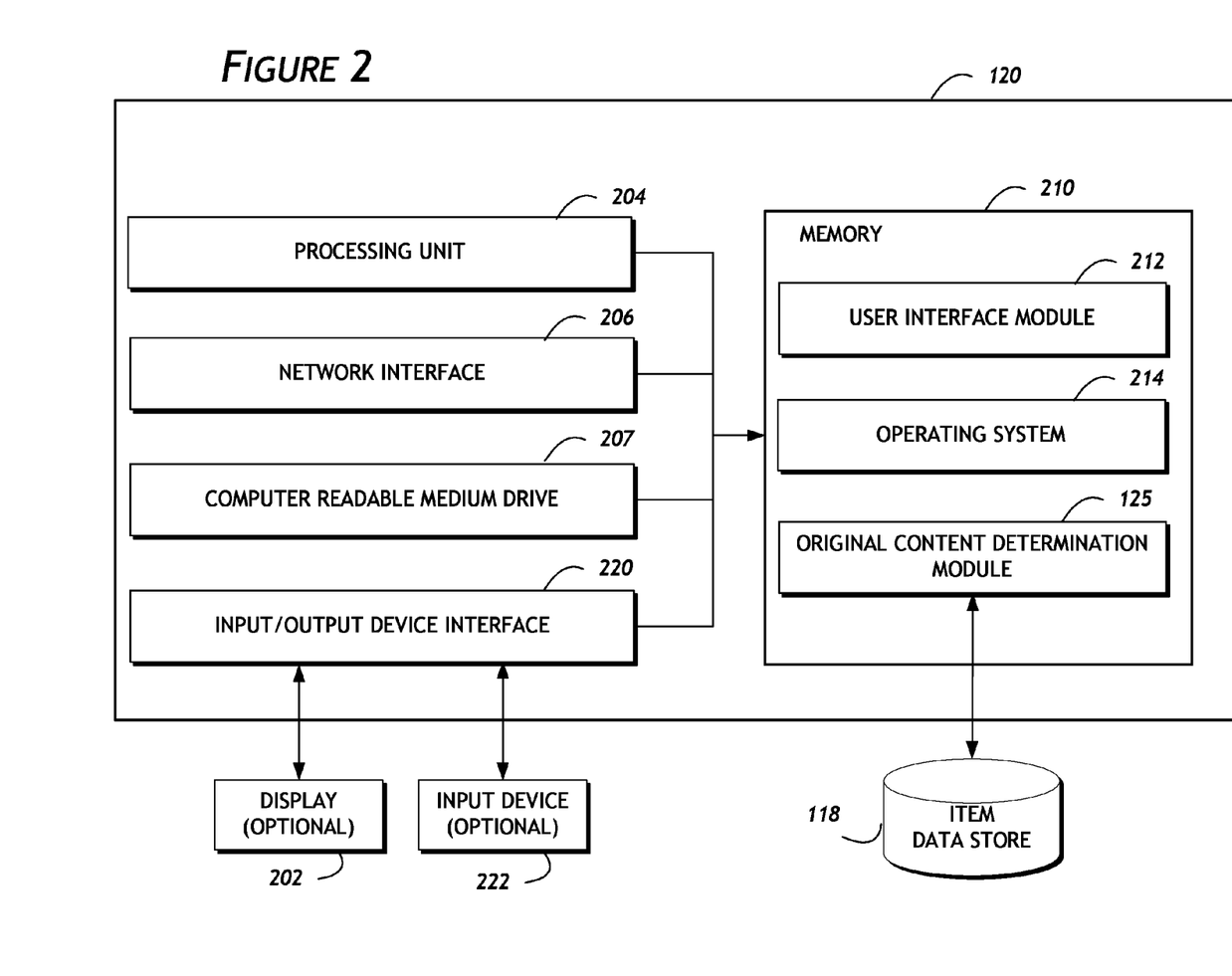
FIG. 2 is a block diagram illustrating a computer device that can perform various methods of determining original content in accordance with one embodiment.

FIG. 2 depicts a general architecture of the original content determination server 120 for determining the originality of content and generating recommendations based on the determined originality. While the original content determination system is depicted in FIG. 2 as implemented by a single computing device (i.e., an original content determination server 120), this is illustrative only. In an actual embodiment, the original content determination system may be embodied in a plurality of computing systems, each executing an instance of the original content determination server. In another embodiment, the original content determination system may be implemented in distributed and/or networked computing systems.

The general architecture of the original content determination server 120 depicted in FIG. 2 includes an arrangement of computer hardware and software components that may be used to implement aspects of the present disclosure. The original content determination server 120 may include many more (or fewer) components than those shown in FIG. 2. It is not necessary, however, that all of these generally conventional components be shown in order to provide an enabling disclosure.

As illustrated in FIG. 2, the original content determination server 120 includes a network interface 206, a processing unit 204, an input/output device interface 220, an optional display 202, an optional input device 222 and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 222. Though not shown, the input/output device interface may also accept input from the optional input device 222 such as a keyboard, mouse, digital pen, trackpad, touchscreen, etc.

The memory 210 contains computer program instructions that the processing unit 204 executes in order to operate the original content determination server. The memory 210 generally includes RAM, ROM and/or other persistent, non-transient memory. The memory 210 may store an operating system 214 that provides computer program instructions for use by the processing unit 204 in the general administration and operation of the original content determination server 120. The memory 210 may further include computer program instructions and other information for implementing features of the original content determination system, including the processes described above. For example, in one embodiment, the memory 210 includes a user interface module 212 that generates user interfaces (and/or instructions therefor) for display upon a client computing device, e.g., via a navigation interface such as a web browser installed on the client computing device. In addition, memory 210 may include or communicate with the item data store 118. Item data stored in item data store 118 may include any information related to an item, such as an item available for purchase, that may be of interest to a consumer or may be useful for classifying the item or determining similarity to other items. Item attributes stored for a given item may depend on the type of item or a category associated with the item. For example, as described above, certain items such as books may have semi-structured data (e.g., textual data) stored in the item data store 118 that can be readily processed by the original content determination server for original content determination. In one embodiment, the item data store 118 also stores data related to the scores and matrices determined/generated by the processes described herein.

In addition to the user interface module 212, the memory 210 may include the original content determination module 125 that may be executed by the processing unit 204. In one embodiment, the original content determination module 125 provides the functionality of the various methods/processes described herein, e.g., determining the originality of the content of an item in a collection of items relative to the content of other items in the collection.

Determining Originality Scores

Figure 3A:
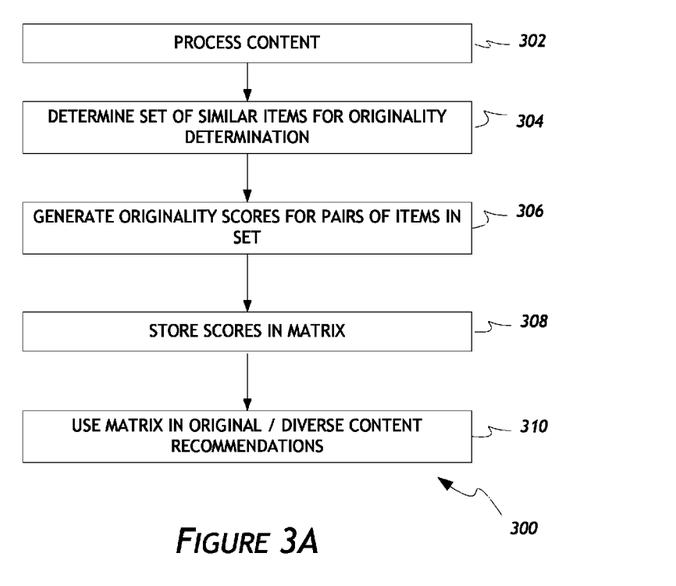
FIG. 3A is a flow diagram depicting an illustrative method of determining originality scores within a collection of items in accordance with one embodiment.

In some embodiments, the original content determination server 120 provides to users recommendations based on an evaluation of the content of the items referenced in the item data store 118. In one embodiment, the evaluation of the content generates originality scores, which are then used as a basis to recommend items with original or diverse content to users. In some embodiments, an originality score indicates a degree to which content of one item in a set of similar items is diverse from the content of another item in the set. FIG. 3A is a flow diagram depicting an illustrative method 300 for determining originality scores within a collection of items in accordance with one embodiment. This illustrative method, as well as those described below, may be performed by a computer device such as that depicted in FIGS. 1 and/or 2. In the embodiment of FIG. 3A, the method 300 begins in block 302, where content for one or more items available for selection is processed for evaluation and later used in recommendations. This method could, for example, include extracting textual data from a collection of items (e.g., books) in a catalog (e.g., a product catalog, library catalog, etc.). In other examples where content is in a non-textual form, the content may be converted to textual data.

In block 304, an item in the collection, e.g., a product catalog, is processed to determine a set of items in the collection that are similar to $I_i$. In block 306, originality scores are generated for pairs of items, with each pair consisting of (1) an item in the set of items that is deemed similar to $I_i$ and (2) $I_i$. In one embodiment, the process repeats the operations in blocks 304 and 306 for each item in a collection of items, so that a matrix of scores can be generated in block 308. However, for the sake of simplicity, the description of blocks 304 and 306 below relates to the processing of one item in the collection.

Returning to the discussion of block 304, in one embodiment, the method 300 compares each of the other items in the collection $I_1$ to $I_N$ to an item $I_i$ to determine items that are similar to item $I_i$. The similarity between two items can be determined in a number of ways. For example, the similarity between two items may be based on view or purchase similarities, which measure the likelihood that the two items are viewed in the same session ("view similarities") or purchased together ("purchase similarities"). In one embodiment, when view or purchase similarities do not exist or are otherwise not available for the two items under evaluation, the method 300 deems the two items to be similar if they share the same topic/classification. For example, if the two items under evaluation are books, they would be deemed similar if they are both computer programming books (i.e., they cover the same topic). In one embodiment, a topic/classification of an item can be identified by determining whether both items are assigned to the same browse node (e.g., a node within a tree of nodes organized by topics/classifications), are assigned the same tags, or have the same textual classification, i.e., identifying the topic of an item by the textual content of the item.

In one embodiment, once a set of similar items is determined for $I_i$, in block 306, the method 300 generates originality scores for pairs of items within the set, with each pair consisting of (1) an item in the set of items similar to $I_i$, and (2) $I_i$. For example, if the set of similar items consists of $I_2$, $I_3$, $I_4$ and $I_5$, the pairs would be ($I_i$, $I_2$), ($I_i$, $I_3$), ($I_i$, $I_4$) and ($I_i$, $I_5$). In one embodiment, an originality score of a pair of items is determined by min-wise independent permutations between the two items under evaluation. The min-wise independent permutations of two items may be computed by first representing the content of the first item ($C_i$) as one group of words and the content of the second item ($C_j$) as another group of words. For example, if an item is a book, the group of words would consist of all words in the book (excluding duplicates and without reference to order or grammar). In one embodiment, natural numbers are then assigned to words in each of the two groups of words, with the same word receiving the same number assignment. In one embodiment, a group of words is a bag of words. For example, the words in the phrase "the same word receives the same number assignment" may be assigned the numbers shown below:

| | |
|---|---|
| the | 1 |
| same | 2 |
| word | 3 |
| receives | 4 |
| the | 1 |
| same | 2 |
| number | 5 |
| assignment | 6 |

In one embodiment, instead of treating the words individually, n-grams are used so that natural numbers are assigned to n number of consecutive words to be grouped and treated as a phrase. The table below shows the number assignments of a 2-gram of the same example phrase:

| | |
|---|---|
| the same | 1 |
| word receives | 2 |
| the same | 1 |
| number assignment | 3 |

In one embodiment, statistically insignificant words such as "the," "a," "or," "not," "of," etc., are removed from the groups of words prior to the number assignments.

Once natural numbers are assigned to the two groups of words, C, and can be represented as a set of natural numbers, i.e., $C_i \supseteq N$ and $C_j \supseteq N$. Thus, for two pieces of content, $C_i$ and $C_j$ the similarity may be measured as the size of their set intersection divided by their set union:

$$\mu = \frac{C_i \cap C_j}{C_i \cup C_j}$$

where $\mu$ is the originality score. Accordingly, the smaller the originality score, the more original the content of one item is compared to the other item. In some embodiments, other techniques such as term-document frequency, inverse document frequency or edit distance may be used instead of min-wise independent permutations to calculate originality scores for pairs of items. In another embodiment, Latent Semantic Analysis (LSA) can be applied to analyze the relationships between a set of items and the words they contain by producing a set of concepts related to the items and words. Applying LSA helps reduce the dimensionality of the data and reduce computationally the number of comparisons that need to be performed to derive the similarity results, since comparison can be performed on the set of concepts instead of individual words. LSA also helps mitigate the effects of synonymy (different words describing the same idea) and polysemy (same word having multiple meanings) on the comparison process. In one embodiment, the scores (regardless of how calculated) are normalized on a scale from 0 to 1 as part of the operation performed in block 306, with 0 denoting the most diverse and 1 denoting the least diverse.

Figure 3B:
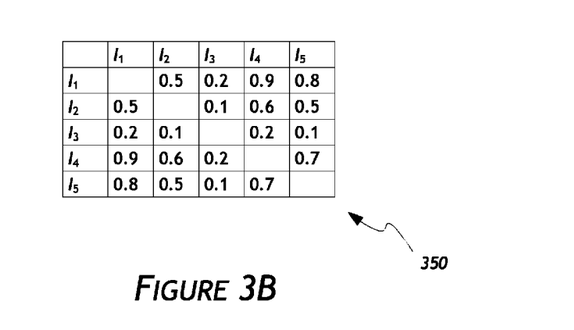
FIG. 3B shows an example matrix of originality scores in accordance with one embodiment.

Returning to FIG. 3A, after the originality scores for all pairs of items have been calculated, the calculated (and in one embodiment, normalized) originality scores are stored in a diversity matrix in block 308. An example of such a diversity matrix is shown in FIG. 3B. The diversity matrix of scores is then used in various original/diverse content recommendation determinations in block 310, as further described below.

Determining Diverse Items

One application of the diversity matrix of scores is providing recommendations of items that are diverse from an item selected by the user. Because the diversity matrix of scores includes originality scores of pairs of items that have been determined to be similar (e.g., have view/purchase similarities or share a same topic), the scores enhance the recommendations that are provided to the user. For example, if a user has selected a book A within a product catalog that includes many books that are similar to book A, the originality scores can be used to recommend one or more books from among those books that are already deemed similar to book A. The recommended books would thus be relevant to book A because they share view/purchase similarities or same the topic, but yet would be diverse from book A in content, a characteristic that is particularly helpful to users who are seeking to discover items with original content. Take for example an avid reader of mystery novels shopping for a new book who may have selected a book written by a familiar author. Recommendations based on view or purchase similarities may include other books written by the same author or other mystery novels, many of which the avid reader may have already purchased or read. The diversity matrix of scores in this example can be used to provide the avid reader recommendations of mystery novels with content that is diverse from his/her selected book. This increases the probability that the recommended books are new to the avid reader.

Figure 4A:
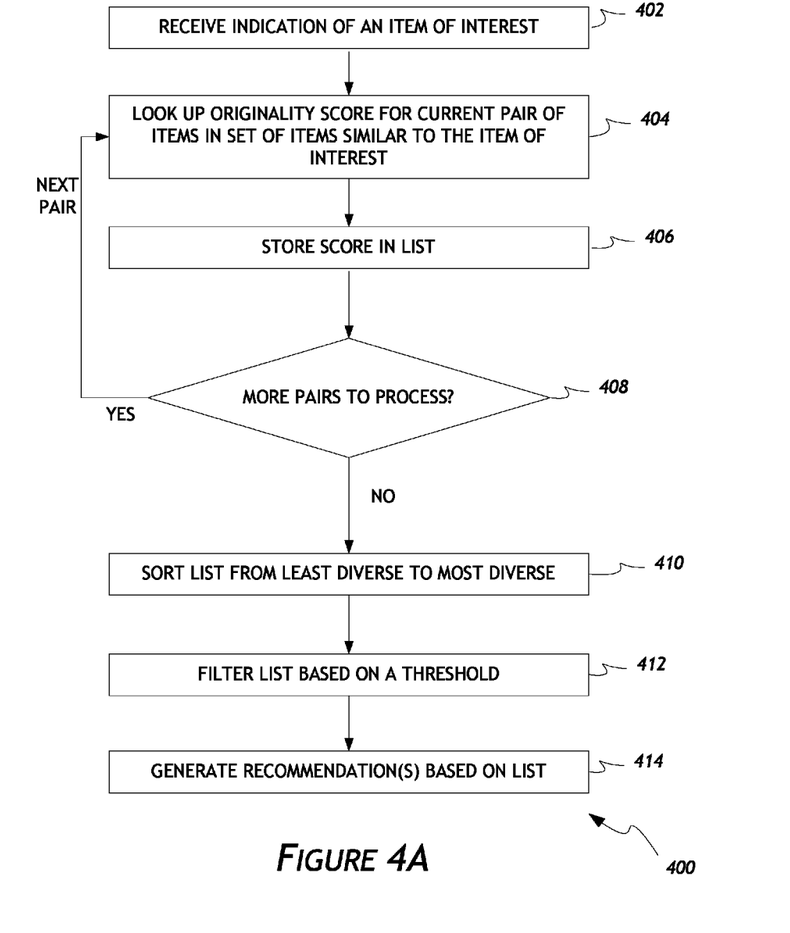
FIG. 4A is a flow diagram depicting an illustrative method of using originality scores in recommending diverse items in accordance with one embodiment.

FIG. 4A is a flow diagram depicting an illustrative method 400 for using originality scores stored in a diversity matrix (such as that shown in FIG. 3B) in recommending diverse items in accordance with one embodiment. The method 400 begins in block 402, where the method 400 receives an indication of an item of interest $I_i$ within a collection. The method in block 404 then looks up, in the diversity matrix, the originality score for each pair of items in the set, with each pair consisting of (1) an item in the set of items similar to $I_i$, and (2) $I_i$. In one embodiment, the diversity matrix is one that has been previously generated by the method 300 shown in FIG. 3A. For example, if $I_i$ is $I_1$ and the set of items that are similar to $I_1$ consists of $I_2, I_3, I_4$ and $I_5$, the pairs would be $(I_1, I_2), (I_1, I_3), (I_1, I_4),$ and $(I_1, I_5)$, and scores from those pairs are obtained from the matrix shown in FIG. 3B. In block 406, the method 400 stores the obtained score for the current pair in a list. In decision block 408, the method 400 determines if there are more pairs of items to process. If so, the method 400 returns to block 404 and looks up the originality score for the next pair of items. In the above example, since there are four pairs to process, four originality scores are obtained from the diversity matrix. The list of scores may be as follows (with reference to the scores in the matrix shown in FIG. 3B):

$$(I_1,I_2)-0.5, (I_1,I_3)-0.2, (I_1,I_4)-0.9, (I_1,I_5)-0.8$$

Once the scores are obtained and stored in the list, the method 400 may sort the list according to a criterion in block 410. For example and as shown in FIG. 4A, the list is sorted from the least diverse, e.g., highest score, to the most diverse, e.g., lowest score, (or vice versa). Thus, using the example above, after sorting, the list may appear as follows:

$$(I_1,I_4)-0.9, (I_1,I_5)-0.8, (I_1,I_2)-0.5, (I_1,I_3)-0.2.$$

In one embodiment, the method 400 may optionally filter the sorted list in accordance with a threshold. The filter may be applied to the list to exclude items that are likely not diverse enough to be useful as recommendations. For example, if a threshold of equal or less than 0.5 is applied, the list would be filtered to:

$$(I_1,I_2)-0.5, (I_1,I_3)-0.2.$$

Figure 4B:
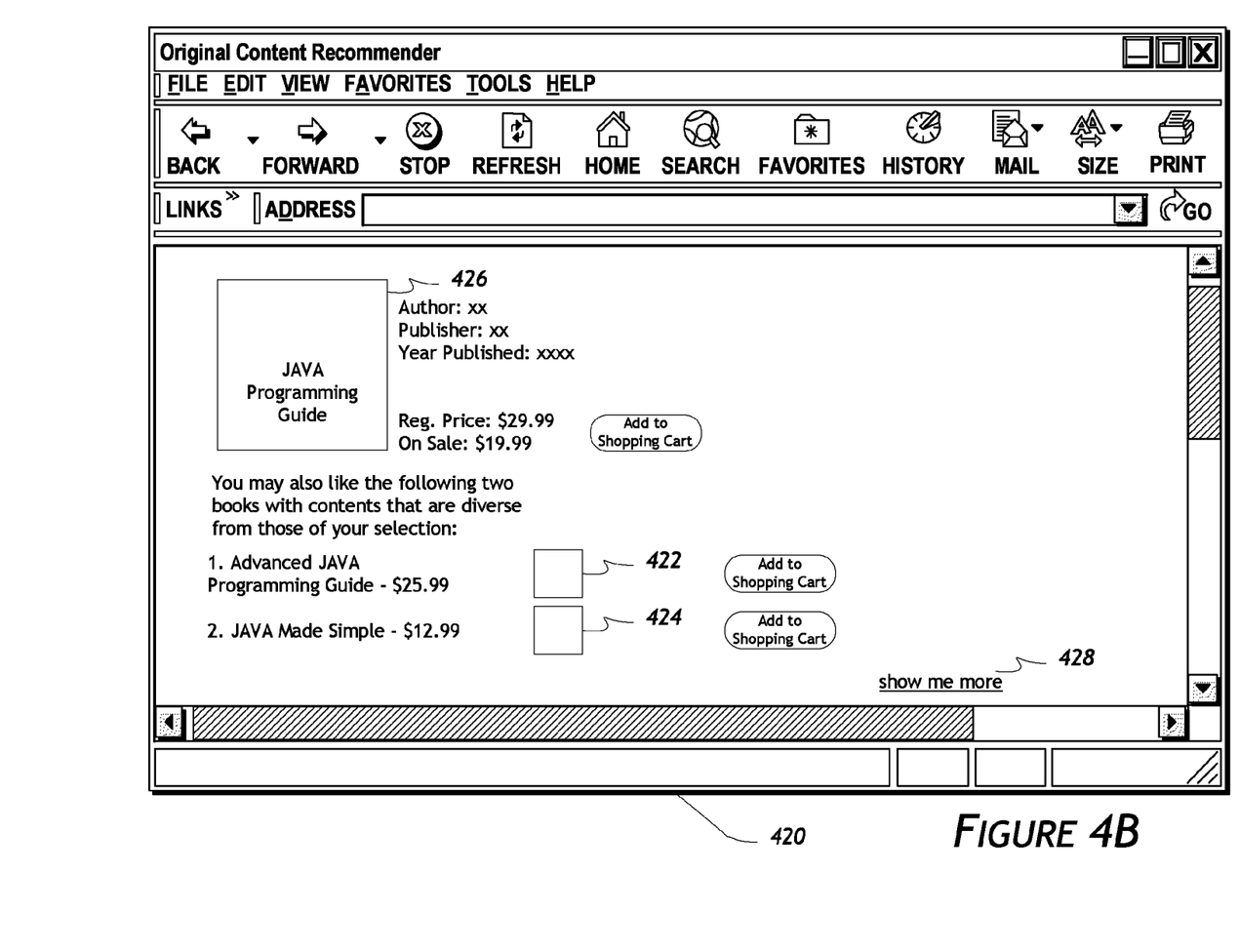
FIG. 4B is an illustrative user interface in which diverse items are recommended in accordance with one embodiment.

In one embodiment, the method 400 uses the list in block 414 to generate recommendations of items with diverse content. For example, the items may be computer programming books within a product catalog and $I_i$ may be a particular book selected by the user. FIG. 4B shows an illustrative user interface 420 showing how such recommendations are provided to the user. In one embodiment, upon the selection of an item by the user, the method 400 may be performed so as to generate a list of items (in this case, computer programming books) sorted from the most diverse to the least diverse (as compared to the user selected item, which is $I_i$ in this example). FIG. 4B shows that the user has selected a book 426 for possible purchase. The list (or a portion thereof) generated by the method 400 may be returned to the user to assist the user in selecting one or more books that have the most diverse content as compared to the book selected by the user. Using the example above, two books, $I_2$ and $I_3$ on the filtered list, may be provided to the user as recommendations. FIG. 4B shows the two books 422 and 424 that are recommended to the user. In one embodiment, as shown in FIG. 4B, the user interface optionally includes a user interface control element 428 through which the user can indicate a desire to be provided with additional recommendations. In one embodiment, once the user indicates this through the user interface control element 428, the filter threshold described above is adjusted so that more items remain on the list, which leads to more items being recommended to the user.

Figure 4C:
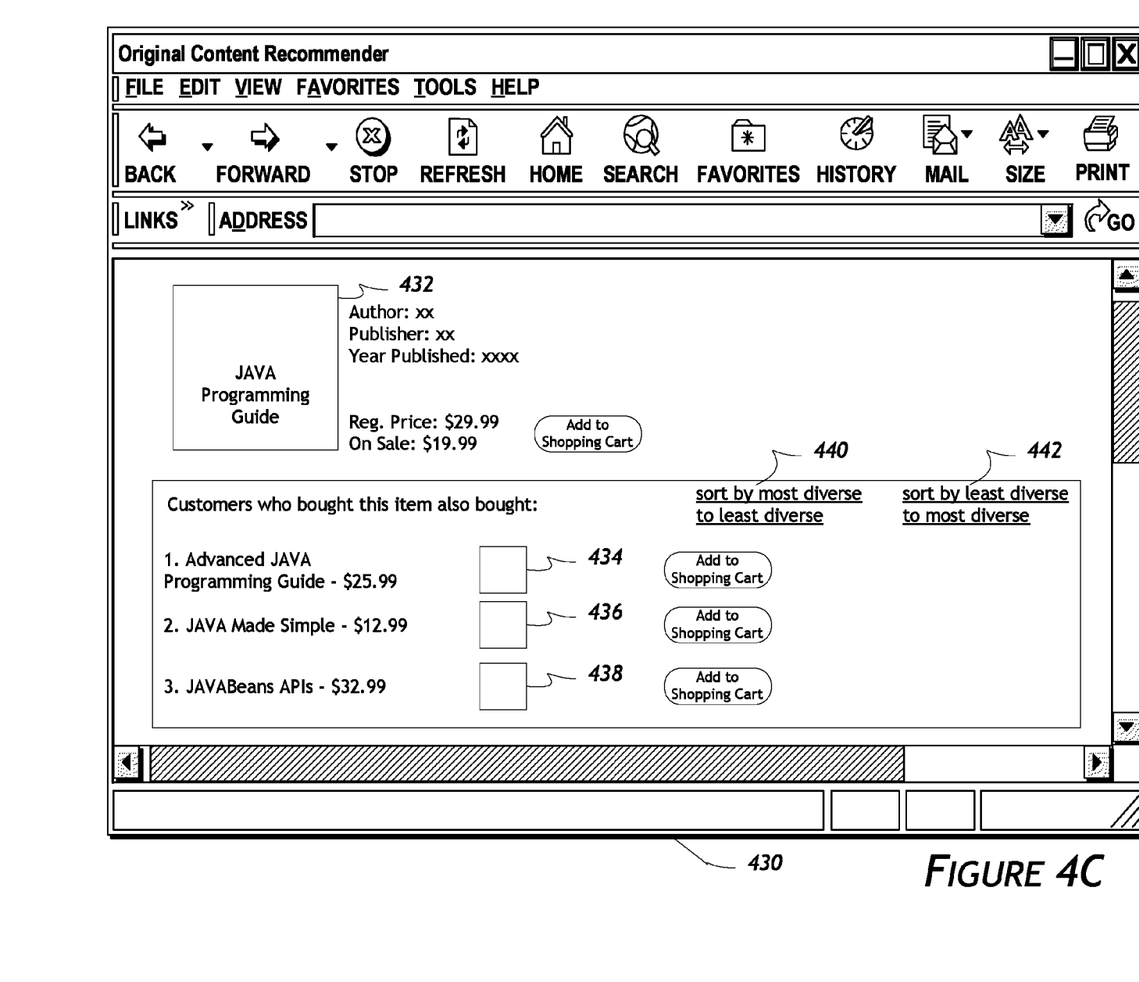
FIG. 4C is an illustrative user interface showing the use of originality scores in generating recommendations in accordance with one embodiment.

In other embodiments, the above described list/scores are used as one of many factors in the selection of recommended items. FIG. 4C is an illustrative user interface 430 that shows how, in one embodiment, the list/scores described above may be used as a factor in a recommendation process that takes into account other considerations such as prior user activity or other user behavior. As shown in the user interface 430, in response to the user's selection of a book 432, a number of books 434, 436 and 438 are recommended to the user based on purchase similarities (i.e., these books are all known to be frequently purchased with the book 432). The user interface 430 provides two user interface control elements 440 and 442 through which these recommendations may be sorted or re-sorted. For example, if the user selects user interface control element 440, the books 434, 436, and 438 are sorted by their originality scores (from most diverse to least diverse) relative to the book 432 selected by the user. Similarly, if the user selects user interface control element 442, books 434, 436, and 438 are sorted by their originality scores (from least diverse to most diverse) relative to the book 432 selected by the user. In other embodiments, the list of recommended books presented to the user is sorted by default from most diverse to least diverse.

Figure 4D:
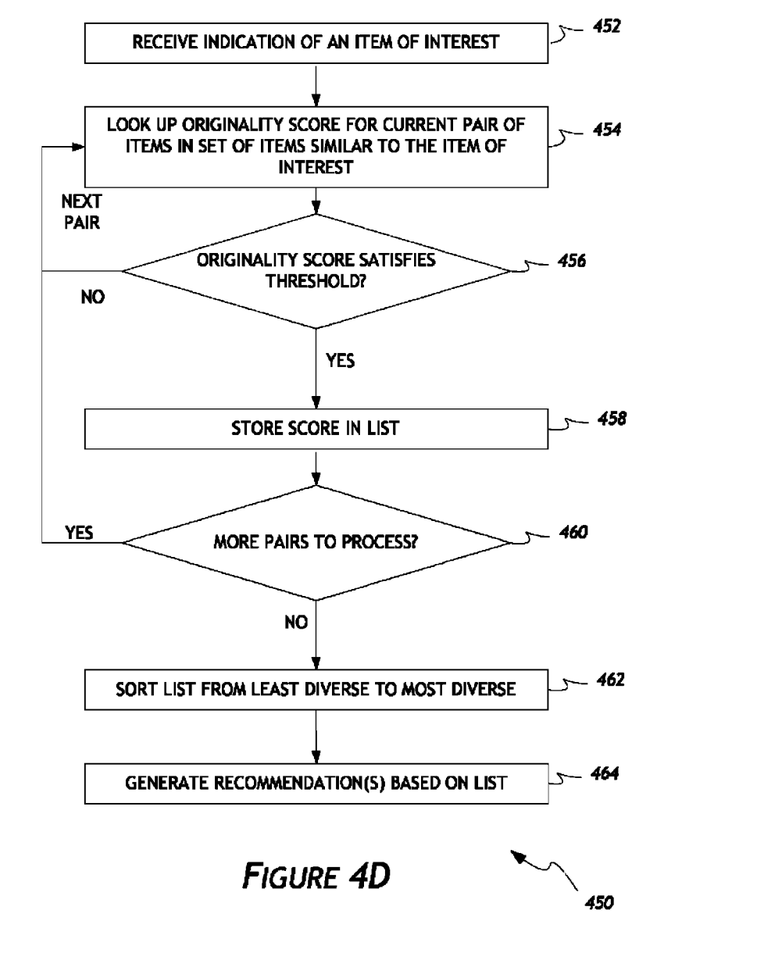
FIG. 4D is a flow diagram depicting an illustrative method of using originality scores in recommending diverse items in accordance with another embodiment.

FIG. 4D is a flow diagram illustrating a method 450 for generating originality scores and recommending diverse items to a user. The method 450 is similar to the method 400, except that filtering of the list is performed in decision block 456, where an additional determination is performed to determine whether an originality score of a particular pair of items satisfies a threshold. The score is stored in the list in block 458 only if the score meets the threshold. For example, if a threshold of 0.5 is used, only scores that are equal to or less than 0.5 are stored. After all the pairs of items have been processed (as determined by decision block 460) the list is sorted and stored in block 462 and can be used in generating recommendations as described above (in block 464).

Determining Originality of Content in Different Versions of the Same Item

Figure 5A:
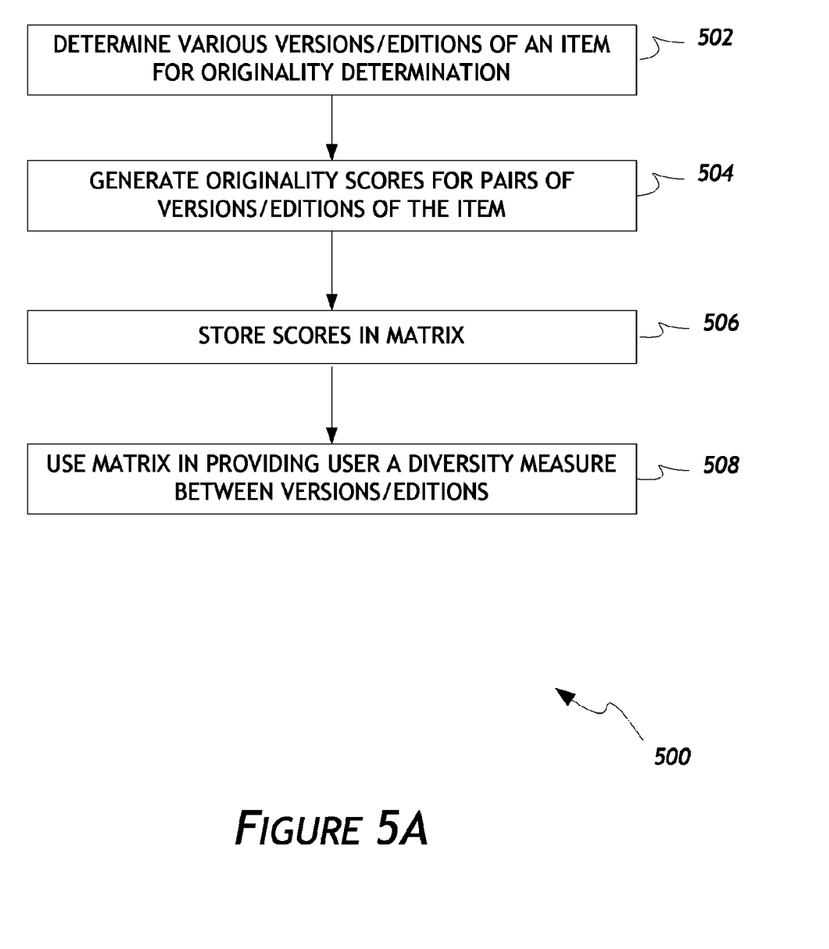
FIG. 5A is a flow diagram depicting an illustrative method of determining the originality of the content of a version of an item relative to the content of another version in accordance with one embodiment.

FIG. 5A is flow diagram depicting an illustrative method 500 for determining the originality of the content of a version of an item relative to the content of another version of the item. The method 500 begins in block 502 by determining various versions or editions of an item for an originality determination. For example, if an item $I_j$ is under a user's consideration for possible purchase, the method 500 identifies the other various versions or editions of $I_j$ (if they exist). Then in block 504, the method 500 determines the originality scores of pairs of item versions/editions, with each pair in one embodiment consisting of (1) one of the other version/editions identified in block 502 for $I_j$, and (2) the item $I_j$ itself. For example, if there are three other versions/editions of $I_j$, namely $I_{j1}$, $I_{j2}$ and $I_{j3}$, the pairs would be $(I_j, I_{j1})$ $(I_j, I_{j2})$ and $(I_j, I_{j3})$. In one embodiment, the scores for the pairs are generated using the methods described above (e.g., based on min-wise independent permutations). In this context, an originality score indicates a degree to which content of the one version/edition of the item is diverse from content of another version/edition of the same item. After the scores are generated, in one embodiment, they are stored in a matrix in block 506. In block 508, the matrix of scores is used in providing the user a diversity measure between versions/editions. In one embodiment, a diversity measure is a percentage reflecting the content difference between two items. In one embodiment, diversity measure is calculated as follows: diversity measure=(1−originality score of the pair)*100%. Thus, if the originality score is 0.5, the diversity measure is 50%.

Figure 5B:
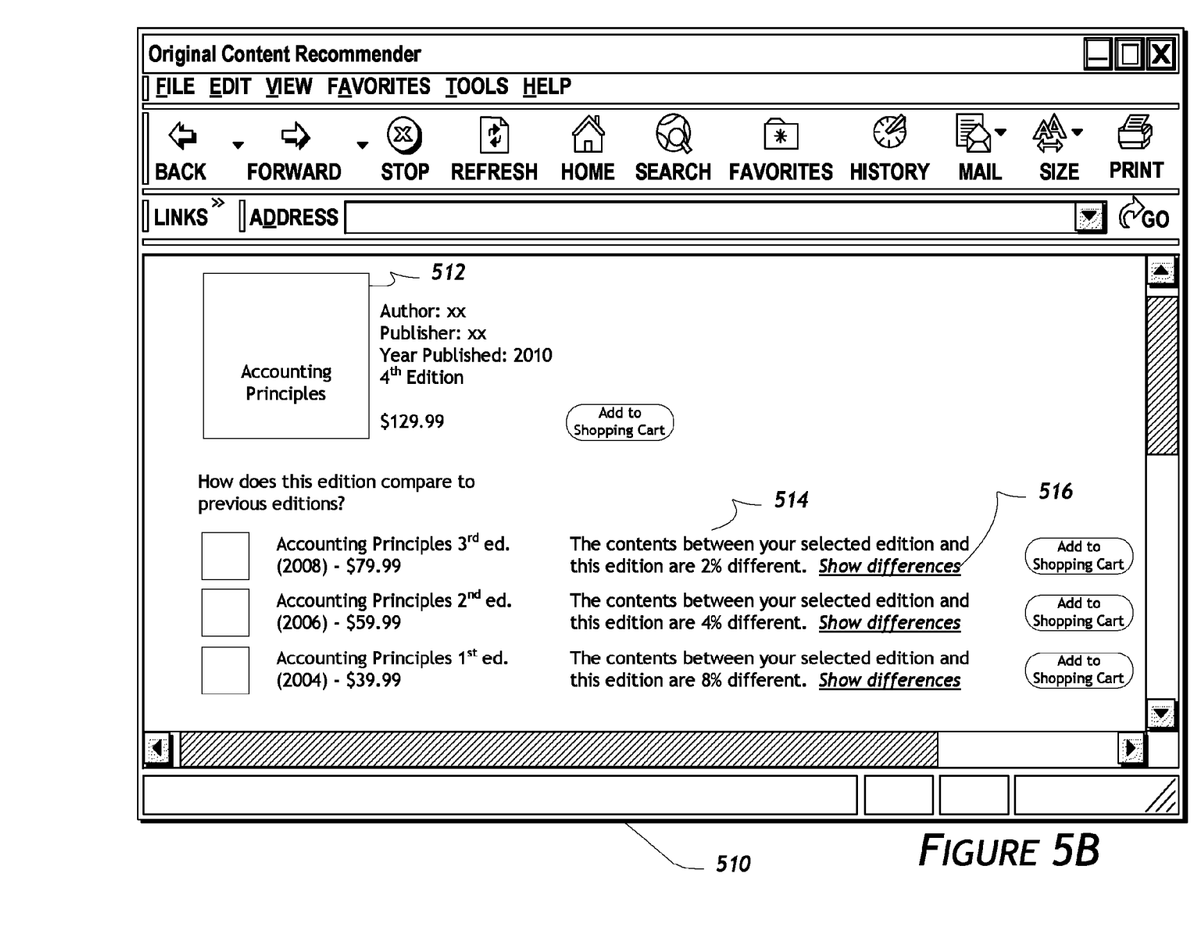
FIG. 5B is an illustrative user interface showing how the method of FIG. 5A aids a user in selecting an item for purchase.

FIG. 5B shows an illustrative user interface 510 illustrating how the diversity measure aids a user in selecting an item for purchase. In the example, item 512 is a textbook that the user has selected for potential purchase ($I_j$ above). In one embodiment, the method 500 may be executed to provide the user the diversity measures of the user selected edition of textbook $I_j$ as compared to other editions of $I_j$, namely $I_{j1}$, $I_{j2}$ and $I_{j3}$. As shown, the user selected edition of the textbook (512) is the latest edition, and the user is shown a number of messages 514 with diversity measures that compare the selected edition with prior editions. In addition to providing the user a quantitative measure of the differences, in one embodiment as shown in FIG. 5B, for each pair of editions, a link 516 is provided to a different user interface where the actual differences in contents between the editions are shown to the user. The user can therefore make an informed purchase decision based on both quantitative and qualitative evaluations of the differences between the editions.

The diversity measures may aid the purchase decision in a number of ways. For example, a user who already owns an older version of a book may use the diversity measure to decide whether the latest version includes sufficient diverse content to justify a purchase. Alternatively, if several versions of the same book are offered for sale, as is the case in the example shown in FIG. 5B, and the diversity measures indicate little changes among the versions, the user may opt to purchase an older (and presumably cheaper) version of the book. For example, in FIG. 5B, the user may opt to purchase the third edition of the textbook since there is only a 2% difference in content between the third edition and the latest one and the third edition is $50 less than the latest edition. As discussed above, the user can also review a comparison of the content differences that is accessible via the link 516 to determine if the 2% difference covers important changes.

Determining Originality of Item Content Relative to Publicly Available Content

Figure 6A:
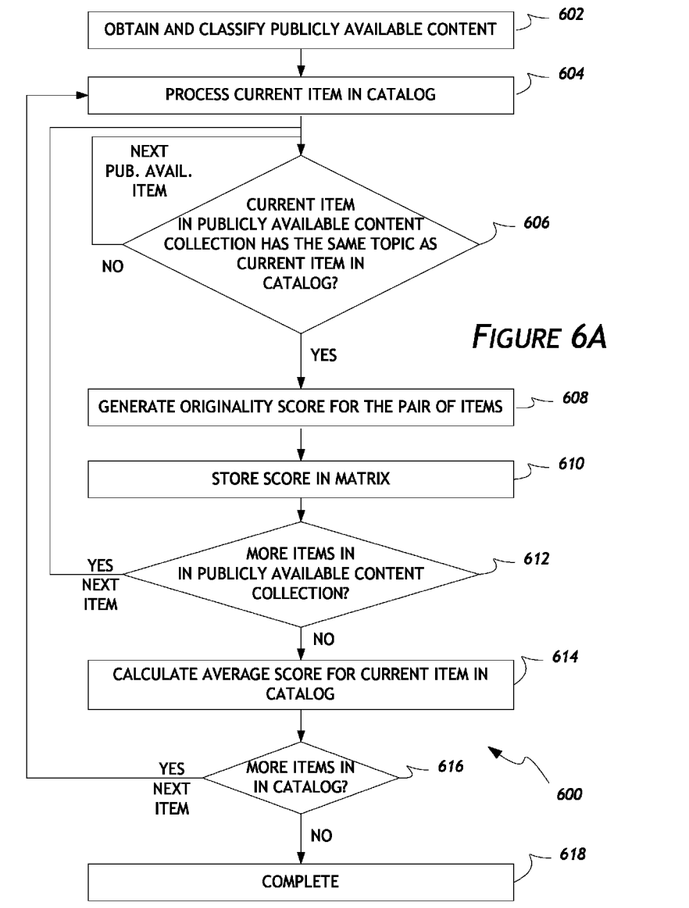
FIG. 6A is a flow diagram depicting an illustrative method of determining the originality of an item relative to publicly available content in accordance with one embodiment.

FIG. 6A is a flow diagram depicting an illustrative method 600 for determining the originality of items relative to publicly (or freely) available items. Although the example illustrated involves items in a product catalog, the applicability of the process 600 is not limited to product catalogs. Rather, the process is applicable to any collection of items. The process begins in block 602, where publicly available items such as websites are obtained and classified. In one embodiment, the classification is based on textual analysis of the content from the publicly available item. In block 604, the method 600 begins processing items in a product catalog and comparing them to publicly available items. For each item in the product catalog, the method 600 determines, through the operations in blocks 606, 608, 610, 612 and 614, how original the item is compared to the publicly available items. For example, in block 606, the method determines whether a current item in the publicly available item collection ($I_{pub-i}$) has the same topic as the current item in the catalog ($I_{cat-i}$) that is under evaluation. In one embodiment, the topic determination is made in accordance with the aforementioned methods, including, but not limited to, determining that the items are assigned to the same browse node, determining that the items have the same tags and determining that the items share the same textual classification.

If the two items are of the same topic, then the method 600 generates, in block 608, an originality score for these two items in accordance with the methods of generating originality score described above. For example, $I_{cat-i}$ may be a recipe book on Italian cooking, and $I_{pub-i}$ may be a website devoted to Italian cuisine. In block 610, the generated originally score is stored in a diversity matrix such as that shown in FIG. 3B. The method 600 then determines, in decision block 612, whether there are additional items in the publicly available item collection, and if so, returns to decision block 606 to process those items with respect to the current product catalog item $I_{cat-i}$. If not, the method 600 proceeds to block 614 to calculate an average of the originality scores generated (and optionally normalized as described above in conjunction with FIG. 3A) for the current product catalog item $I_{cat-i}$. The average of the originality scores generated provides a quick way to determine how original the content of an item is compared to publicly available content. In other embodiments, variations other an average, such as a mean of the originality scores generated, are used. The example table below lists the originality scores of the example Italian recipe book compared to the example five websites deemed to be of the same topic, along with the average originality score:

| Recipe Book compared to: | Originality Score (Normalized on a scale of 0 to 1) |
|---|---|
| cooking website 1 | 0.4 |
| cooking website 2 | 0.7 |
| cooking website 3 | 0.9 |
| cooking website 4 | 0.1 |
| cooking website 5 | 0.8 |
| Average: | 0.58 |

Next, in decision block 616, the method 600 determines if there are additional items in the product catalog that need to be processed. If so, the process returns to block 604 to process the next item in the product catalog. Otherwise, the method 600 completes in block 618. In one embodiment, at the completion of the method 600, each item in the product catalog will have an average originality score. In one embodiment, the method 600 provides a diversity measure for an item, which is calculated as follows: diversity measure=(1−average originality score of the item)*100%. Thus, if the average originality score is 0.58, the diversity measure is 42%.

Figure 6B:
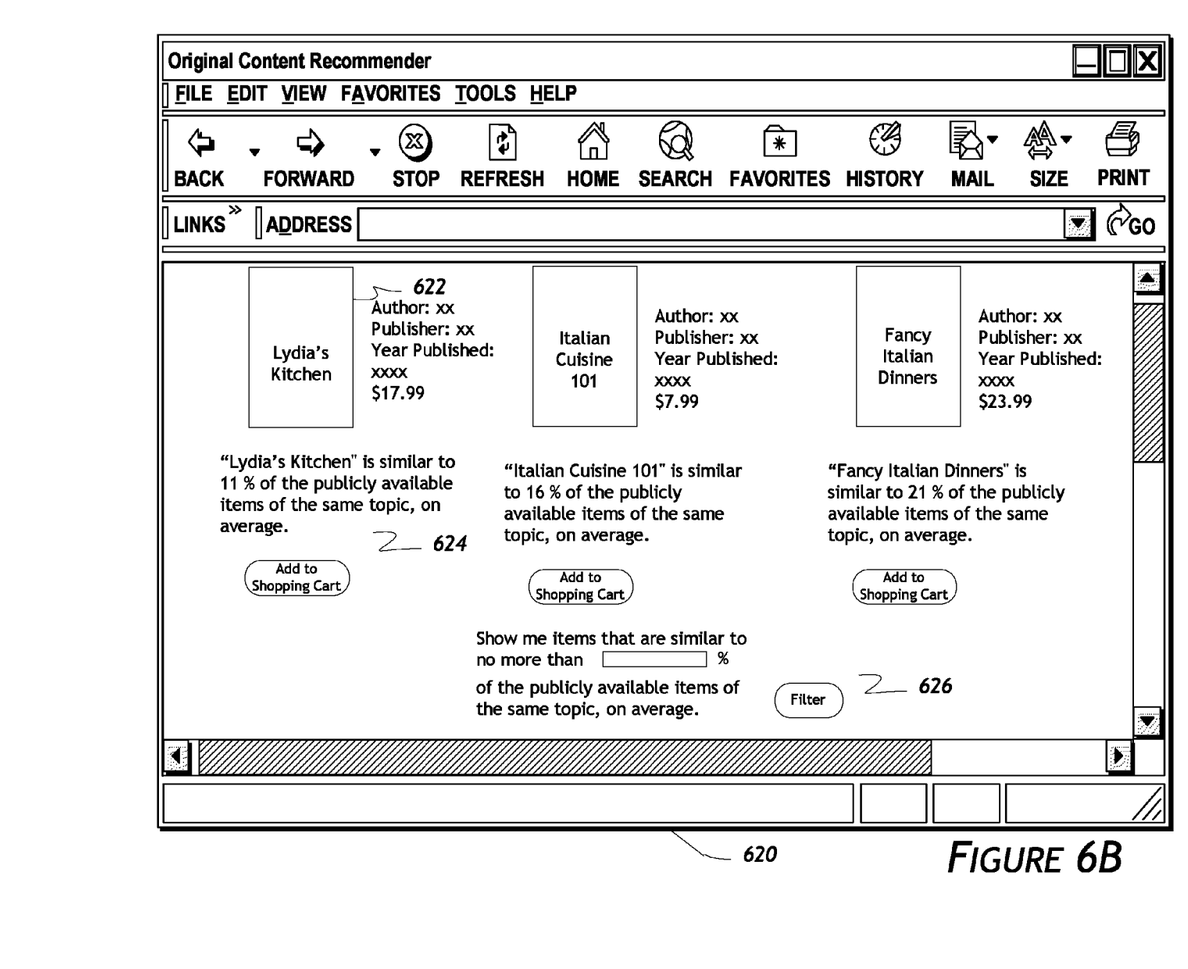
FIG. 6B is an illustrative user interface showing how the method of FIG. 6A aids a user in selecting an item for purchase.

The method 600 may thus generate diversity measures for various items in the product catalog. FIG. 6B shows an illustrative user interface 620 illustrating how the diversity measures aid a user in selecting an item for purchase. Shown in the user interface 620 are several cookbooks available for purchase. A diversity measure for each cookbook is provided to the user. For example, a cookbook 622, titled *Lydia's Kitchen*, is displayed with the message "*Lydia's Kitchen* is similar to 11% of the publicly available items of the same topic, on average." As discussed above, publicly available items may include publicly/freely accessible websites, for example. In one embodiment, the user interface 620 further provides a user interface control element 626 through which the user can specify a maximum diversity measure criterion for filtering the items to be recommended to the user. In another embodiment, items with diversity measures meeting a certain threshold specified by default are provided to the user as recommendations.

CONCLUSION

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware. In addition, the components referred to herein may be implemented in hardware, software, firmware, or a combination thereof.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

One skilled in the relevant art will appreciate that the methods and systems described above may be implemented by one or more computing devices, such as a memory for storing computer executable components for implementing the methods shown, for example in FIGS. 3A, 4A, 4D, 5A and 6A, as well as a processor unit for executing such components. It will further be appreciated that the data and/or components described above may be stored on a computer readable medium and loaded into memory of a computer device using a drive mechanism associated with a computer readable medium storing the computer executable components (such as a CD-ROM or DVD-ROM). Further, the component and/or data can be included in a single device or distributed in any manner.

It should be emphasized that many variations and modifications may be made to the above-described embodiments, the elements of which are to be understood as being among other acceptable examples. For example, while the various examples provided above relate to electronic commerce, embodiments are applicable to other contexts including aiding library users in selecting books. All such modifications and variations are intended to be included herein within the scope of this disclosure and protected by the following claims.

What is claimed is:

1. A computer-implemented method comprising:
 as implemented by one or more computing devices configured with specific executable instructions,
  for each of one or more other versions of an item that are different than a first version of the item, generating an originality score for a pairing including the other version of the item and the first version of the item, the originality score indicating a degree to which content of the other version of the item is diverse from content of the first version of the item, wherein the originality score is generated based at least in part on a comparison of the content of the other version of the item with the content of the first version of the item; and
  determining a diversity measure for the first version of the item that indicates a degree to which the first version of the item differs from the one or more other versions of the item, wherein the diversity measure is determined based at least in part on the one or more generated originality scores, wherein the diversity measure indicates a percentage or amount of content of the first version of the item that is different than content of the one or more other versions of the item.

2. The computer-implemented method of claim 1, wherein the item is a book.

3. The computer-implemented method of claim 2, wherein the one or more other versions of the item comprise one or more different editions of the book.

4. The computer-implemented method of claim 1, wherein the comparison of the content of the other version of the item with the content of the first version of the item is based on at least one of min-wise independent permutations, term-document frequency, and latent semantic analysis.

5. The computer-implemented method of claim 1, wherein the diversity measure for the first version of the item measures the degree to which the first version of the item differs from two or more other versions of the item.

6. A system comprising:
a data store configured to store content of items; and
a computing device, comprising one or more processors, in communication with the data store that is configured to:
retrieve, from the data store, content of a first version of an item;
retrieve, from the data store, content of one or more other versions of the item that are different than the first version of the item;
for each of the one or more other versions of the item, generate an originality score for a pairing including the other version of the item and the first version of the item, the originality score indicating a degree to which content of the other version of the item is diverse from content of the first version of the item, wherein the originality score is generated based at least in part on a comparison of the content of the other version of the item with the content of the first version of the item; and
determine a diversity measure for the first version of the item that indicates a degree to which the first version of the item differs from the one or more other versions of the item, wherein the diversity measure is determined based at least in part on the one or more generated originality scores, wherein the diversity measure indicates a percentage or amount of content of the first version of the item that is different than content of the one or more other versions of the item.

7. The system of claim 6, wherein the item is an electronic book.

8. The system of claim 6, wherein the comparison of the content of the other version of the item with the content of the first version of the item is based on at least one of min-wise independent permutations, term-document frequency, and latent semantic analysis.

9. A computer-readable, non-transitory storage medium storing computer-executable instructions that, when executed by a computer system, configure the computer system to perform operations comprising:

retrieving, from an electronic data store, content of a first version of an item and content of two or more other versions of the item;

for each of the two or more other versions of the item, generating an originality score for a pairing including the other version of the item and the first version of the item, the originality score indicating a degree to which content of the other version of the item is diverse from content of the first version of the item, wherein the originality score is generated based at least in part on a comparison of the content of the other version of the item with the content of the first version of the item; and determining a diversity measure for the first version of the item that indicates a degree to which the first version of the item differs from the two or more other versions of the item, wherein the diversity measure is determined based at least in part on the two or more generated originality scores.

10. The computer-readable, non-transitory storage medium of claim 9, wherein the diversity measure indicates a percentage of content of the first version of the item that is different than content of the two or more other versions of the item.

11. The computer-readable, non-transitory storage medium of claim 9, wherein the first version of the item comprises a particular edition of a book, wherein the two or more other versions of the item include another edition of the book.

12. The computer-readable, non-transitory storage medium of claim 9, wherein the comparison of the content of the other version of the item with the content of the first version of the item is based on at least one of min-wise independent permutations and term-document frequency.

* * * * *